US006752441B1

(12) United States Patent
Morris

(10) Patent No.: US 6,752,441 B1
(45) Date of Patent: Jun. 22, 2004

(54) METHOD AND DEVICE FOR LIFTING LIDS

(76) Inventor: Jerry Morris, 1056 W. 6th Pl., Mesa, AZ (US) 85201

( * ) Notice: Subject to any disclaimer, the term of this patent is extended or adjusted under 35 U.S.C. 154(b) by 0 days.

(21) Appl. No.: 10/318,045

(22) Filed: Dec. 12, 2002

(51) Int. Cl.$^7$ ................................................ A47J 45/10
(52) U.S. Cl. ........................ 294/12; 294/34; 294/103.1
(58) Field of Search ................................. 294/9, 10, 11, 294/12, 13, 19.1, 26, 27.1, 34, 50.9, 103.1; 16/425, 431

(56) References Cited

U.S. PATENT DOCUMENTS

| 248,805 A | * | 10/1881 | Silvey ............................ 7/109 |
| 1,166,301 A | * | 12/1915 | Yoho ............................ 294/12 |
| 4,222,599 A | | 9/1980 | Gale |
| 4,832,389 A | | 5/1989 | Orton |
| 5,071,182 A | * | 12/1991 | Mair ............................ 294/12 |
| 5,183,304 A | | 2/1993 | Mair |
| 5,314,220 A | | 5/1994 | Clement |
| 5,346,268 A | * | 9/1994 | Baker et al. .................... 294/9 |
| 6,182,650 B1 | * | 2/2001 | Tuttle ............................ 126/30 |

* cited by examiner

*Primary Examiner*—Dean J. Kramer
(74) *Attorney, Agent, or Firm*—Etherton Law Group, LLC

(57) ABSTRACT

A device for grasping and lifting a lid handle of a vessel, such as a Dutch oven. The device securely attaches to the lid of a vessel due to a spring-like mechanism that acts in conjunction with two elongated rods. A grasping structure, such as a hook, is attached to one end of a longer rod and a cooperating stabilizing structure is connected to the end of a shorter rod. Both rods have handles for squeezing by the user. When the user squeezes the handles of the rods, the lid handle can be engaged with the hook. When the user releases the handles, the spring-like mechanism fully extends and pulls the hook away from the lid handle, while the stabilizing structure, such as a horseshoe, is forced firmly against the lid.

6 Claims, 6 Drawing Sheets

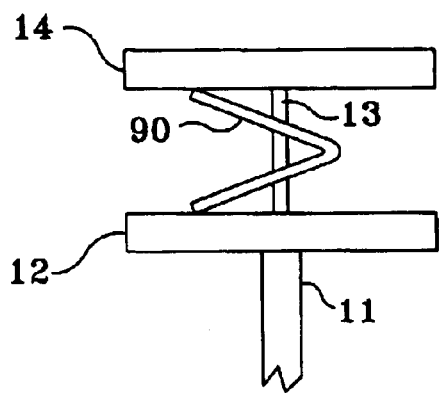
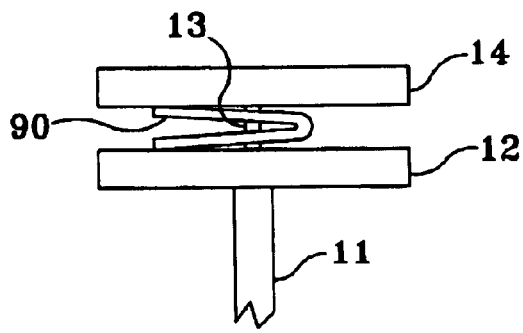
Figure 9　　　　　Figure 10
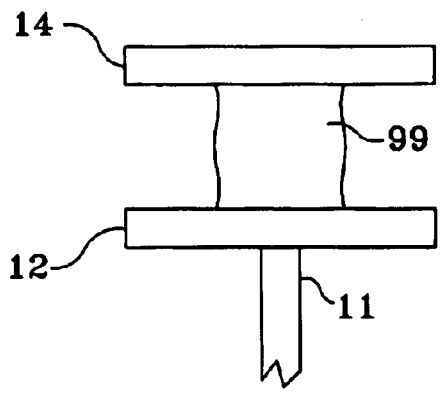
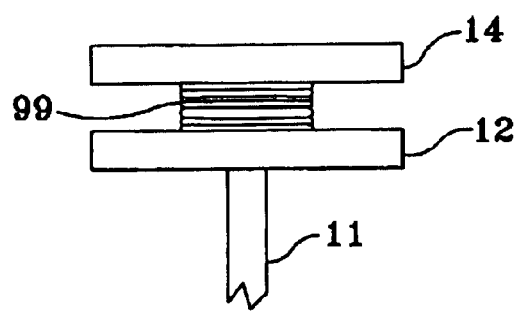
Figure 11　　　　　Figure 12

US 6,752,441 B1

METHOD AND DEVICE FOR LIFTING LIDS

FIELD OF INVENTION

This invention pertains to devices designed for grasping and removing lids from vessels. This invention is specifically designed for grasping and stably removing the lid of a Dutch oven.

BACKGROUND

One way of cooking outdoors is by using a Dutch oven covered in charcoal or the burning embers from a campfire. A Dutch oven may be used to bake sourdough bread, stews, or a variety of meats. Depending on what is being cooked, the cooking process may last several hours.

A Dutch oven is typically made of cast iron, with a smooth bottom, and several short legs for raising it above the heat source. The lid of a Dutch oven usually has a lip or flange for keeping the charcoal on top. The lids are designed to be lifted while fully loaded with ash and coals. However, because of the heavy weight of a Dutch oven and the intense heat of the heat source, it is often difficult to remove the lid of the oven to inspect the cooking ingredients or to serve the food once it is cooked.

Many devices have attempted to accommodate the difficulties of cooking with a Dutch oven. However, in general, these devices have failed to accomplish the basic task of easily removing and maneuvering the very hot lid of a Dutch oven without endangering the cook or the food. Many of the devices are unsatisfactory because they are incapable of stabilizing the lid. In one instance, a device requires the user to synchronize the movements of two different rods. This requires the user to readjust the device each and every time the lid of the oven is moved or removed. The instability of these devices also creates the problem of the lid tipping over, which can cause the ashes or charcoal to fall into the food. Many of the devices are also inadequate because they do not enable the user to operate far enough away from the heat source to safely and conveniently maneuver the lid.

The device for lifting lids described herein overcomes the aforementioned problems associated with the prior art devices by enabling a user to firmly secure it to the lid of a cooking vessel. The present invention contains a simple, but clever, mechanism for creating constant tension between the device and the lid, even when the user lets go of the device.

Therefore, it is an object of this invention to provide a device that significantly contributes to the ease and operation of the lid of a cooking vessel such as a Dutch oven.

Another object of the present invention is to provide a device that in its rest position is securely attached to the lid of the Dutch oven. Another object is to provide a sure-proof way of stabilizing the lid so that it can be easily controlled and will not inadvertently be tipped while being lifted.

It is a further object of the invention that the device does not require any further adjustments or re-adjustments once it is positioned on the lid of the oven.

Another object of the invention is that it enables the user to safely remove a lid without risking harm from accidental burns.

Further objects and advantages of the present invention will become apparent from the study of the following portions of this specification, the claims and the attached drawings.

SUMMARY OF THE INVENTION

The present invention is a device for grasping and lifting a lid of a vessel such as a Dutch oven. The body of the device is a pair of elongated rods, each with a handle for the user to hold. In the preferred embodiment the second rod has a smaller circumference than the first and passes freely through the inside of the first rod along a common axis. A stabilizing structure, such as a horseshoe, is attached to one end of the first rod and a grasping structure, such as a hook, is attached to an end of the second rod. A means for maintaining tension between the grasping structure and the stabilizing structure, such as a spring, is provided. The handles, stabilizing structure and grasping structure cooperate such that when the user releases the two handles, the extension of the tension means causes the hook to pull away from the lid, which forces the horseshoe firmly against the lid.

BRIEF DESCRIPTION OF THE DRAWINGS

FIG. 9 is a front view of the two handles and the spring-form clip when the clip is fully extended.

FIG. 10 is a front view of the two handles and the spring-form clip when the clip is fully compressed.

FIG. 11 is a front view of the two handles and a compressible, resilient, heat-resistant material when the material is fully extended.

FIG. 12 is a front view of the two handles and compressible, resilient, heat-resistant material when the material is fully compressed.

DETAILED DESCRIPTION OF THE INVENTION

Figure 1:
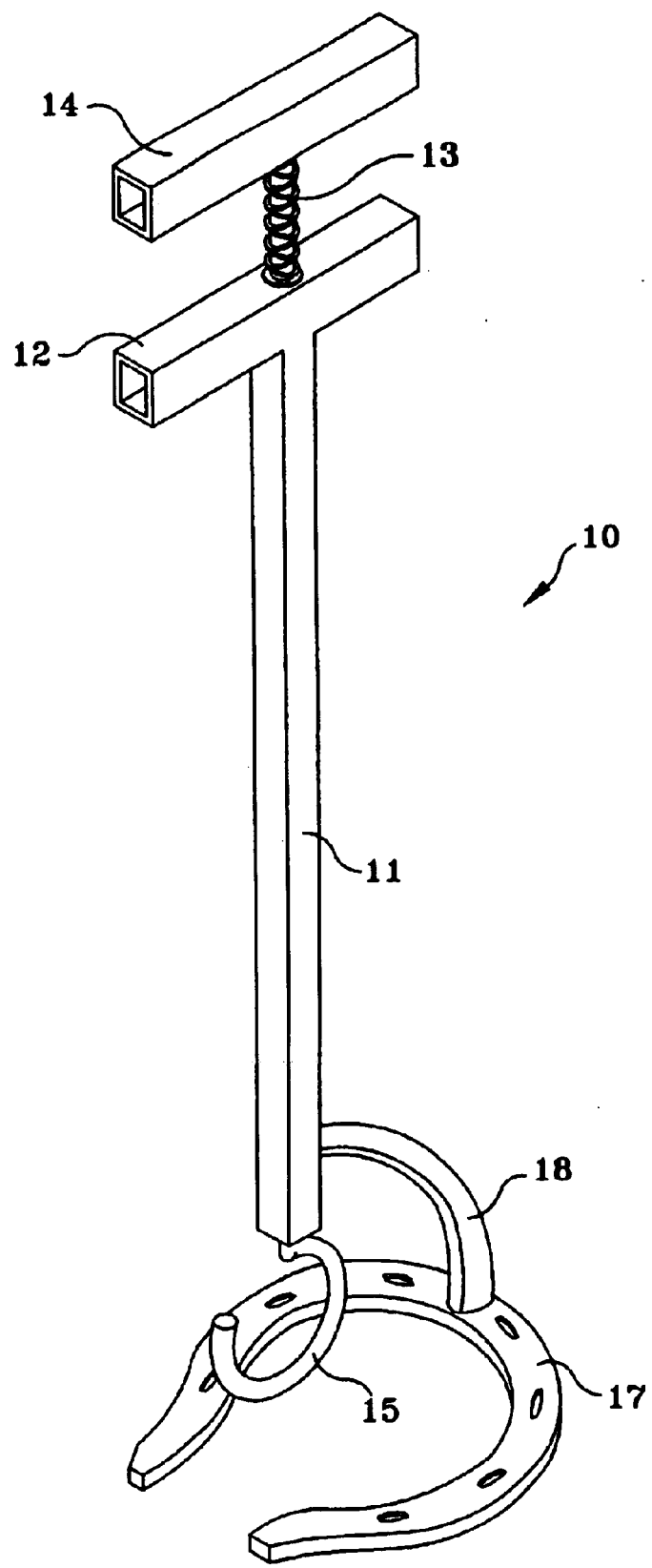
FIG. 1 is a perspective view of the lid lifting device standing upright.

The preferred embodiment of the invention, designated 10, is illustrated with reference to FIGS. 1–8. In FIG. 1, the lid lifting device 10 is shown standing upright. The lid lifting device 10 consists generally of a hollow, elongated first rod 11 with a first end and a second end, with the first end having a handle 12 for the user to hold. An elongated second rod 13, which is longer than first rod 11, moves parallel to the first rod 11. In the preferred embodiment, the second rod 13 moves freely inside first rod 11 along a common axis. Second rod 13 has a first end and a second end, with the first end having a handle 14 and the second end having a hook 15 for grasping the lid handle. In the preferred embodiment, first rod 11 and rod handles 12 and 14 have a rectangular cross-section, but any shape will suffice. Also in the preferred embodiment, a single C- hook 15 is employed as the grasping structure. However, the grasping structure could also be multiple hooks, a scoop, an L-hook or any other structure that could fit under a lid handle of a vessel.

A stabilizing structure is connected to the second end of the first rod. This stabilizing structure cooperates with the grasping structure to hold the lid securely. In the preferred embodiment, a horseshoe-shaped member 17 is connected to the first rod member 11 with a connecting member 18. Horseshoe 17 may be replaced by other shapes of stabilizing members, such as a circular or triangular member, as long as the stabilizing member provides sufficient contact with the lid to ensure the rods remain in a substantially static position relative to the lid. Further, a single small, straight member or multiple small, straight members could be used in place of the small, curved connecting member 18.

The present device further includes a means for maintaining tension between the stabilizing structure and the grasping structure, such that the stabilizing structure is forced apart from the grasping structure when the device is at rest. The tension enables the lid to be held securely by the present device without having to constantly squeeze the rod handles together. In the preferred embodiment, a spring 16 is positioned between rod handles 12 and 14. When the rod handles are squeezed together, the spring 16 compresses, forcing the second rod 13 to move relative to the first rod 11, such that the hook 15 extends beyond first rod 11. This enables the hook 15 to be easily engaged to the lid handle 21. As the rod handles 12 and 14 are released, the spring expands, pushing the handles apart. This results in forcing the first rod 11 down and, consequently, the horseshoe 17 against the lid 20. Simultaneously, the second rod 13 and, consequently the hook 15, are pulled upwards, relative to the first rod 11. The spring tension tends to force the hook 15 and the horseshoe 17 apart, and thus holds the lid stably against the present device.

The tension required to hold the lid firmly is directly related to the spring force: the stronger the tension desired, the stronger the spring force needed. Preferably the spring tension is high, enabling the lid to be held most firmly. Significant effort may be needed, therefore, to compress the spring. Consequently the handles are typically compressed with the palm facing downwards on handle 14, enabling the user to exert arm and body strength in compressing the spring, as shown in FIG. 3, as opposed to grasping only with the fingers.

It is contemplated that other means for maintaining the tension can be used, such as a spring-form clip or a piece of compressible, resilient heat-resistive material. FIG. 9 shows a front view of handles 12 and 14, when a spring-form clip 90 is fully extended. FIG. 10 shows a front view of handles 12 and 14 when they are squeezed together, causing spring-form clip 90 to compress. FIGS. 10 and 11 illustrate a compressible, resilient, heat-resistant material 99 in an extended and compressed view, respectively. Moreover, while the preferred embodiment shows the tension means placed between the handles, it is contemplated that the means can be placed at the other end of the rods or even in the middle of the rods.

Figure 2:
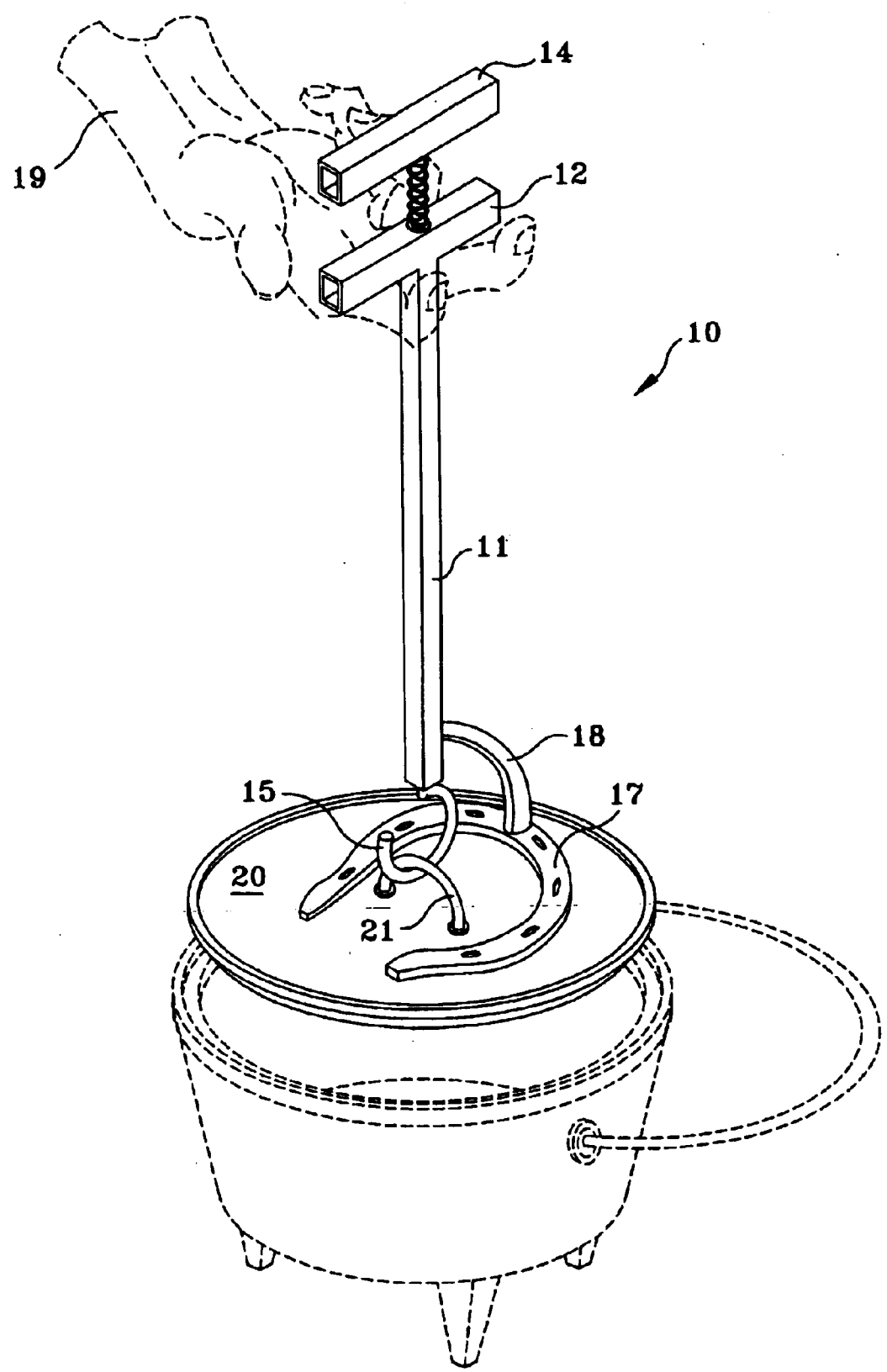
FIG. 2 is perspective view of the lid lifting device when it is firmly attached to the lid of a cooking vessel and the spring mechanism is fully extended.

In FIG. 2, the lid lifting device 10 is shown firmly clasped to the lid 20 of a Dutch oven. The lid can be lifted without squeezing the handles, as illustrated with a user's hand 19 shown under handle 12. Handles 12 and 14 are not being squeezed and spring 16 is fully extended in a relaxed position. Hook 15 is snugly fitted around lid handle 21. In addition, horseshoe-shaped member 17 is firmly pressed against lid 20.

Figure 3:
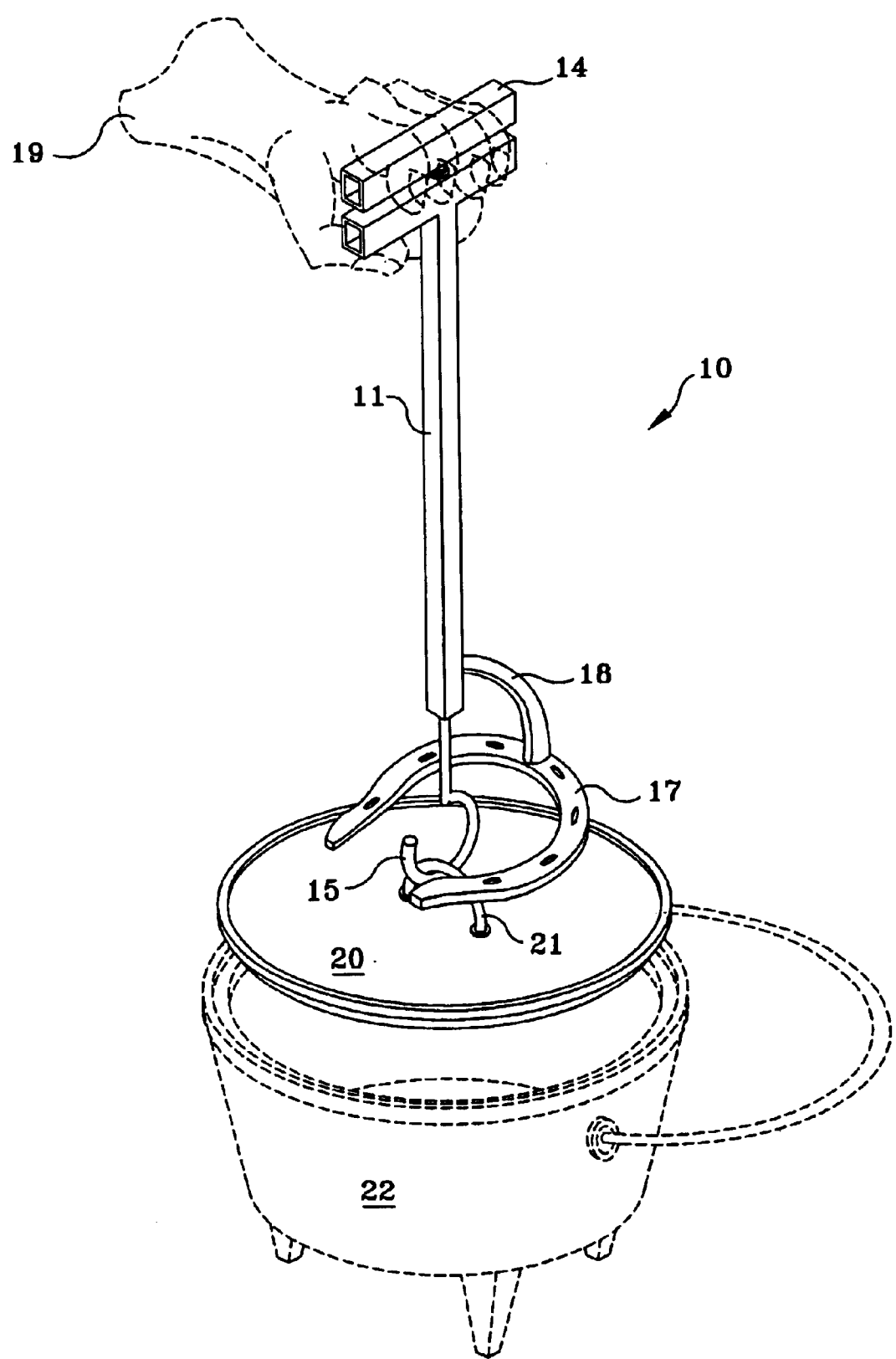
FIG. 3 is a perspective view of the lid lifting device when the spring mechanism is fully compressed between the two handles, causing the hook to separate from the handle of the lid.

In FIG. 3, the lid lifting device 10 is shown with both handles 12 and 14 squeezed together by a user's hand 19. When this happens, hook 15 is released and pushed away from lid handle 21, allowing the user to disengage horseshoe-shaped member 17 away from lid handle 21.

Figure 4:
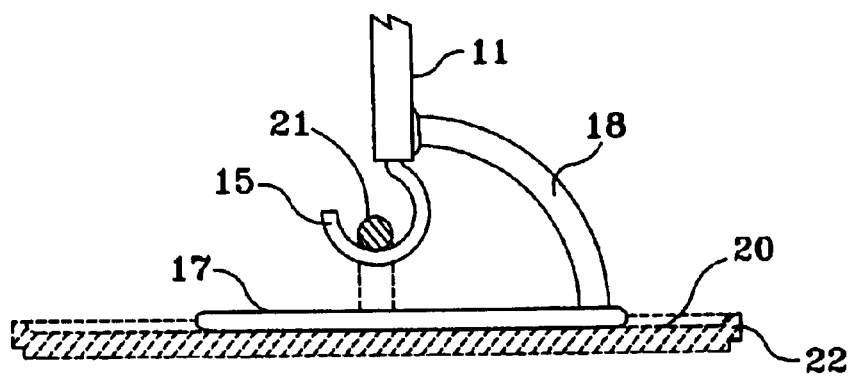
FIG. 4 is a side view of the lid lifting device attached securely to the lid with horseshoe firmly pressed against the lid.

In FIG. 4, a side view of the bottom portion of lid lifting device 10 is shown in conjunction with lid handle 21 of lid 20 of vessel 22. This figure depicts what happens when handles 12 and 14 are released and spring 16 is fully extended, pulling rod member 13 away from the vessel. Hook 15 is pulled tight against lid handle 21, while horseshoe-shaped member 17 presses firmly against lid of vessel 20.

Figure 5:
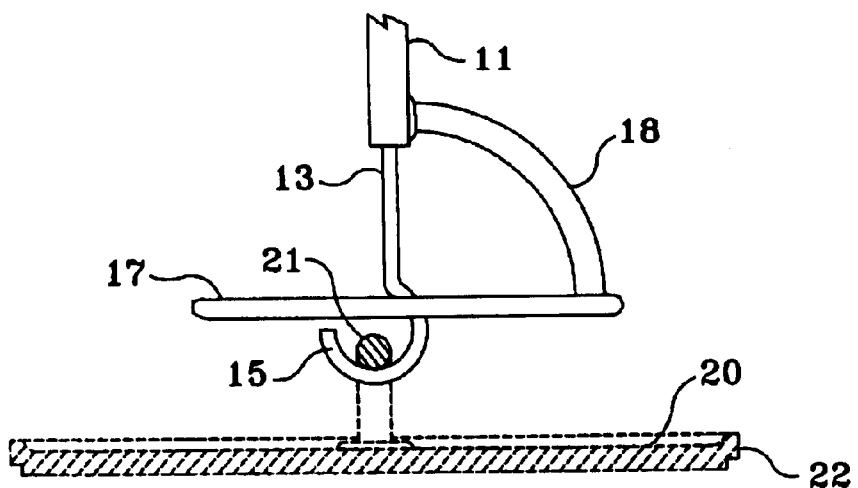
FIG. 5 is a side view of the lid lifting device as it first engages the lid handle.

In FIG. 5, a side view of the bottom portion of lid lifting device 10 is shown in conjunction with lid handle 21 of lid 20 of vessel 22. In this figure, handles 12 and 14 are being squeezed by a user, which forces hook 15 away from rod member 11 and lid handle 21. Also, in this depiction, horseshoe-shaped member 17 is not pressed against lid of vessel 20.

Figure 6:
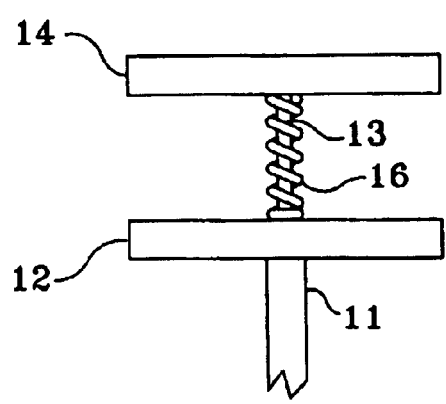
FIG. 6 is a front view of the two handles and the spring mechanism when the spring is fully extended.
Figure 7:
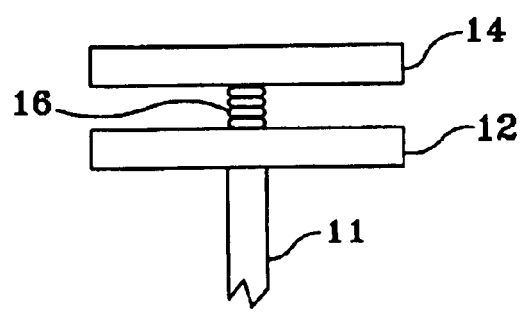
FIG. 7 is a front view of the two handles and the spring mechanism when the spring is fully compressed.

FIG. 6 shows a front view of handles 12 and 14, when spring 16 is fully extended FIG. 7 shows a front view of handles 12 and 14 when they are squeezed together, causing spring 16 to be fully compressed.

Figure 8:
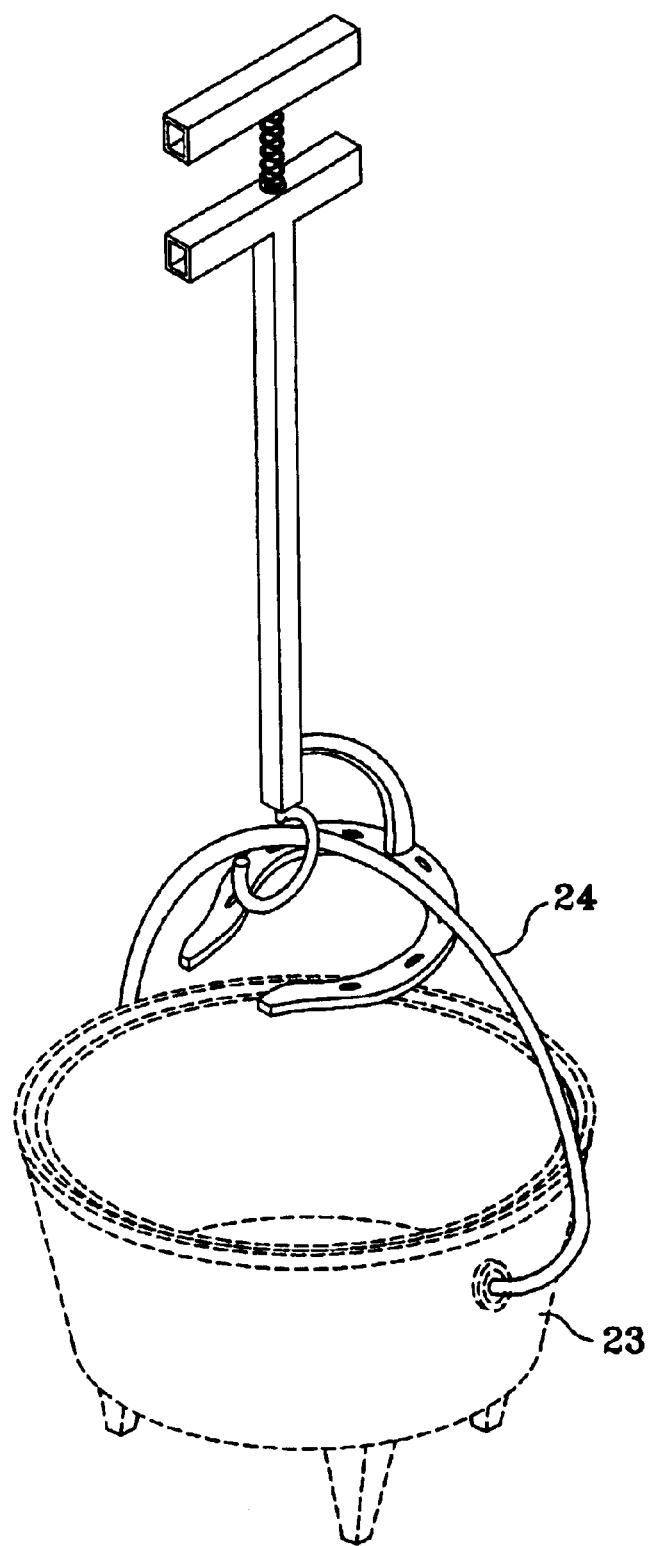
FIG. 8 is a perspective view of the lid lifting device being used to lift the hinged bail of a cooking vessel.

In addition to lifting the lid of a Dutch oven, the present device can also be used for lifting or toting other equipment, particularly that that is often used in conjunction with Dutch ovens. For example, FIG. 8, shows a perspective view of lid lifting device 10 as it is used to lift the bail 24 of a cooking vessel 23.

While there has been illustrated and described what is at present considered to be the preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of the appended claims.

What is claimed is:

1. A device for grasping a handle on a lid, the device comprising:
   a) a first rod member having a first end and a second end, the first end having a handle and the second end having a stabilizing structure;
   b) a second rod member having a first end and a second end, the first end having a handle and the second end having a gasping structure;
   wherein the second rod member is longer than the first rod member, is smaller in circumference, and passes freely through the first rod member along a common axis; and
   c) means for providing tension between the stabilizing structure and the grasping structure; such that the stabilizing structure is forced apart from the grasping structure when the device is at rest, thereby enabling the device to stably grasp the lid handle when the device is at rest.

2. The device according to claim 1 wherein the means for maintaining tension between the stabilizing structure and the grasping structure is a spring-form clip.

3. The device according to claim 1 wherein the means for maintaining tension between the stabilizing structure and the grasping structure is a piece of compressible, resilient, heat-resistant material.

4. The device according to claim 1 wherein the stabilizing structure is a horseshoe-shaped member connected to the first rod member.

5. A device for grasping a lid handle, the device comprising:
   a) a first rod being hollow and having a first end and a second end, the first end having a handle and the second end having a horseshoe attached to the first rod with a curved member;
   b) a second rod having a first end and a second end, the first end having a handle and the second end having a hook, the second rod being longer and of smaller circumference than the first rod and moving slidably within the first rod;
   c) a spring between the handle of the first rod and the handle of the second rod;
   wherein the first and second rods cooperate with the lid handle such that;
      (i) squeezing the rod handles towards each other causes the hook to extend, thereby permitting the hook to engage the lid handle;
      (ii) releasing the rod handles causes the hook to retract, thereby creating a tension between the lid handle and horseshoe;
   such that the lid is stably attached to the device until the handles are squeezed together again to release the tension and permit the hook to be disengaged from the lid handle.

6. A method for grasping a lid handle, the method comprising the steps of:
   a) obtaining a device for grasping a handle, the device comprising:
      i. a first rod member having a first end and a second end, the first end having a handle and the second end having a stabilizing structure;
      ii. a second rod member having a first end and a second end, the first end having a handle and the second end having a grasping structure;
      iii. means for maintaining tension between the stabilizing structure and the grasping structure such that the stabilizing structure is forced apart from the grasping structure when the device is at rest;
   b) simultaneously squeezing the handle of the first rod member and the second rod member toward each other;
   c) engaging the lid handle with the grasping structure; and
   d) releasing the handles of the first rod member and second rod member, causing the means for maintaining tension between the stabilizing structure and the grasping structure to fully extend, which produces the tension that presses the stabilizing structure against the lid.

* * * * *